United States Patent
Mitsuyasu

Patent Number: 5,204,576
Date of Patent: Apr. 20, 1993

[54] DEVICE FOR DRIVING A PIEZOELECTRIC ELEMENT

[75] Inventor: Masaki Mitsuyasu, Susono, Japan

[73] Assignee: Toyota Jidosha Kabushiki Kaisha, Toyota, Japan

[21] Appl. No.: 716,712

[22] Filed: Jun. 17, 1991

[30] Foreign Application Priority Data

Jun. 18, 1990 [JP] Japan .................. 2-157701

[51] Int. Cl.$^5$ ......................................... H01L 41/08
[52] U.S. Cl. .................... 310/317; 310/316; 318/116
[58] Field of Search ................. 310/316, 317; 318/116

[56] References Cited

U.S. PATENT DOCUMENTS

| | | | |
|---|---|---|---|
| 4,404,502 | 9/1983 | Magori et al. | 318/116 |
| 4,510,464 | 4/1985 | Takahashi | 310/316 |
| 4,688,536 | 8/1987 | Mitsuyasu | 310/317 |
| 4,732,129 | 3/1988 | Takigawa et al. | 310/316 |
| 4,767,959 | 8/1988 | Sakakibara et al. | 310/317 |
| 4,966,119 | 10/1990 | Mitsuyasu et al. | 123/498 |
| 5,036,263 | 7/1991 | Yamada et al. | 318/116 |
| 5,053,668 | 10/1991 | Mitsuyasu | 310/317 |
| 5,057,734 | 10/1991 | Tsuzuki et al. | 310/317 |

FOREIGN PATENT DOCUMENTS

| | | |
|---|---|---|
| 0305344 | 8/1988 | European Pat. Off. . |
| 2589523 | 10/1986 | France . |
| 62-117250 | 7/1987 | Japan . |
| 62-117251 | 7/1987 | Japan . |

OTHER PUBLICATIONS

Copending U.S. Patent Application Ser. No. 295296 (filing date: Jan. 10, 1989).
Copending U.S. Patent Application Ser. No. 461236 (filing date: Jan. 5, 1990).

Primary Examiner—Steven L. Stephan
Assistant Examiner—Thomas M. Dougherty
Attorney, Agent, or Firm—Kenyon & Kenyon

[57] ABSTRACT

A device for driving a piezoelectric element comprising a power condenser for charging the piezoelectric element. When the discharging operation of the piezoelectric element is started, the piezoelectric element is initially discharged to the high voltage side terminal of the power condenser via a discharging coil and then discharged to the ground via the discharging coil. When the discharging operation is carried out, the voltage at the terminal of the piezoelectric element drops to a minimum voltage. The start time of the discharge to the ground is controlled so that the minimum voltage becomes equal to a predetermined negative voltage.

17 Claims, 4 Drawing Sheets

DEVICE FOR DRIVING A PIEZOELECTRIC ELEMENT

BACKGROUND OF THE INVENTION

1. Field of the Invention

The present invention relates to a device for driving a piezoelectric element.

2. Description of the Related Art

In a well known device for charging and discharging a piezoelectric element, the electric charge is charged to a power condenser in a piezoelectric element through a charging coil, and the electric charge in the piezoelectric element is discharged through a discharging coil. This device, however, has a problem in that the discharged electric charge is wastefully consumed.

To solve the above problem, in a well known device for charging and discharging a piezoelectric element a part of the discharged electric charge is recovered through a power condenser, to thus lower the power consumption (refer to Japanese Utility Model Publication No. 62-117251). In the above device for charging and discharging a piezoelectric element, first an electric charge in a piezoelectric element is discharged to a high potential side of a power condenser through a discharging coil and a switching means, during a discharging operation, to thus recover the discharged electric charge by the power condenser, and then the electric charge in the piezoelectric element is discharged to the ground through a discharging coil and a switching means when the terminal voltage of the piezoelectric element reaches a predetermined setting voltage or lower.

An amount of expansion of the piezoelectric element is determined by the difference between the terminal voltage (positive voltage) of the electric element during a charging operation and the minimum terminal voltage (negative voltage) of the piezoelectric element after a discharging operation is completed. Since the terminal voltage of the piezoelectric element during the charging operation is influenced by the terminal voltage of the piezoelectric element prior to charging, i.e., the minimum and negative terminal voltage of the piezoelectric element after the charging operation is completed, it is necessary to control the minimum and negative terminal voltage of the piezoelectric element after the completion of the discharging operation to a constant negative voltage, to thereby control the amount of expansion of the piezoelectric element to a constant value. As disclosed in the above-mentioned Japanese Unexamined Utility Model Publication No. 62-117251, however, where the electric charge in the piezoelectric element is discharged to the ground when the terminal voltage of the piezoelectric element reaches a predetermined setting voltage or lower, the terminal voltage of the piezoelectric element is later reduced and becomes a minimum and negative terminal voltage, which is not fixed at that time, and therefore, the amount of expansion of the piezoelectric element cannot be precisely controlled to a constant value.

SUMMARY OF THE INVENTION

An object of the present invention is to provide a piezoelectric element driving device capable of controlling the amount of expansion and contraction of the piezoelectric element to a predetermined amount.

According to the present invention, there is provided a device for driving a piezoelectric element, comprising: a power condenser having a high voltage side terminal; first switching means connected between the piezoelectric element and the high voltage side terminal of the power condenser for charging the piezoelectric element by using a high potential at the high voltage side terminal of the power condenser; second switching means connected between the piezoelectric element and the ground for discharging the piezoelectric element to the ground via a first discharging coil; third switching means connected between the piezoelectric element and the high voltage side terminal of the power condenser for discharging the piezoelectric element to the high voltage side terminal of the power condenser via a second discharging coil; control means for controlling the second switching means and the third switching means to initially discharge the piezoelectric element to the high voltage side terminal of the power condenser and then discharge the piezoelectric element to the ground; and detecting means for detecting a negative voltage at a terminal of the piezoelectric element after the discharging operation of the piezoelectric element is completed and before the charging operation of the piezoelectric element is started, the control means controlling a switching time of the second switching means to make the negative voltage a predetermined voltage.

The present invention may be more fully understood from the description of preferred embodiments of the invention set forth below, together with the accompanying drawings.

DESCRIPTION OF THE PREFERRED EMBODIMENTS

The present invention is now described by exemplifying a device for driving a piezoelectric element for controlling a fuel injection.

First, a fuel injection valve using a piezoelectric element will be described with reference to FIG. 3.

Figure 3:
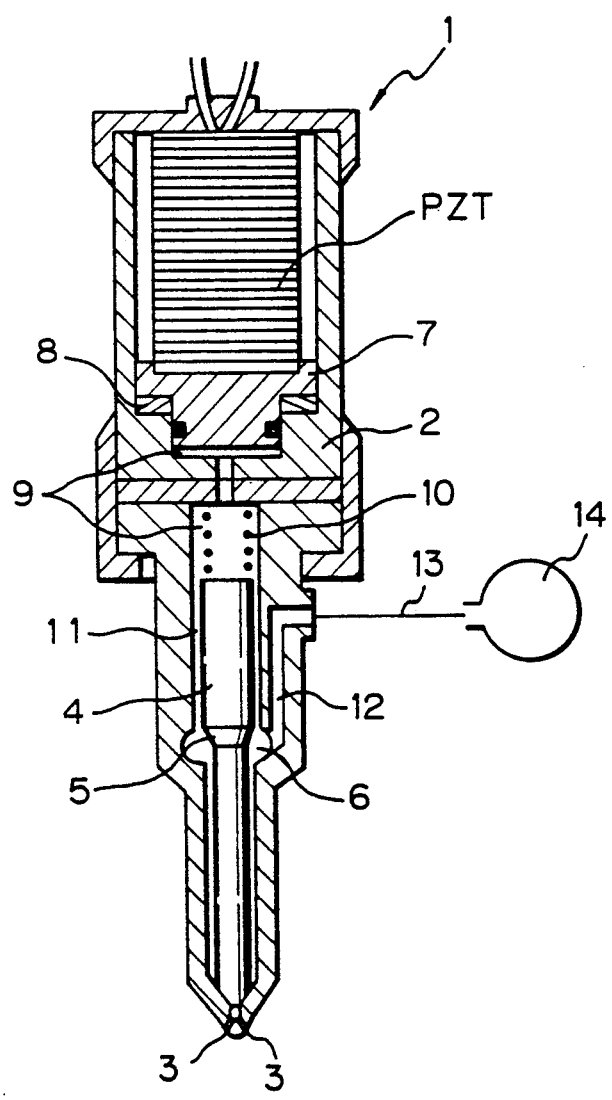
FIG. 3 is a side sectional view of a fuel injection valve.

As shown in FIG. 3, a fuel injection valve 1 comprises a needle 4 slidingly inserted into a housing 2 to control the opening and closing of a nozzle port 3, a needle pressurizing chamber 6 formed on the circumference of a conical pressure receiving face 5 of the needle 4, a piston 7 slidingly inserted into the housing 2, a piezoelectric element PZT inserted between the housing 2 and the piston 7, a disk spring 8 biasing the piston 7 toward the piezoelectric element PZT, a pressure control chamber 9 formed between the needle 4 and the piston 7, and a compression spring 10 biasing the needle 4 toward the nozzle port 3. The pressure control chamber 9 is connected to the needle pressurizing chamber 6 through a restriction passage 11 formed on the circumference of the needle 4, and the needle pressurizing chamber 6 is connected to an accumulator 14 filled with high pressure fuel, through a fuel passage 12 and a fuel distribution pipe 13. The high pressure fuel in the accumulator 14 is conducted to the needle pressurizing chamber 6, and a part of the high pressure fuel is fed to the pressure control chamber 9 through the restriction passage 11, and thus the fuel pressure in the needle pressurizing chamber 6 and the pressure control chamber 9 is substantially equal to the high pressure in the accumulator 14.

When electric charge in the piezoelectric element PZT is discharged and the piezoelectric element is contracted, the piston 7 is raised, and therefore, the fuel pressure in the pressure control chamber 9 is abruptly lowered, and as a result, the needle 4 is raised and an injection of fuel from the nozzle port 3 is started. While the fuel injection is carried out, the fuel in the needle pressurizing chamber 6 is fed to the pressure control chamber 9 through the restriction passage 11, so that the fuel pressure in the pressure control chamber 9 is gradually increased. Then, when the electric charge is charged in the piezoelectric element PZT and the piezoelectric element PZT is expanded, the piston is lowered, the therefore, the fuel pressure in the pressure control chamber 9 is quickly increased. As a result, the needle 4 is lowered to close the nozzle port 3, and thus the fuel injection is stopped. Since the fuel in the pressure control chamber 9 flows into the needle pressurizing chamber 6 through the restriction passage 11, while the fuel injection is stopped the fuel pressure in the pressure control chamber 9 gradually falls and returns to an original high pressure.

The device for driving the piezoelectric element PZT shown in FIG. 3 will be described with reference to FIG. 1.

Figure 1:
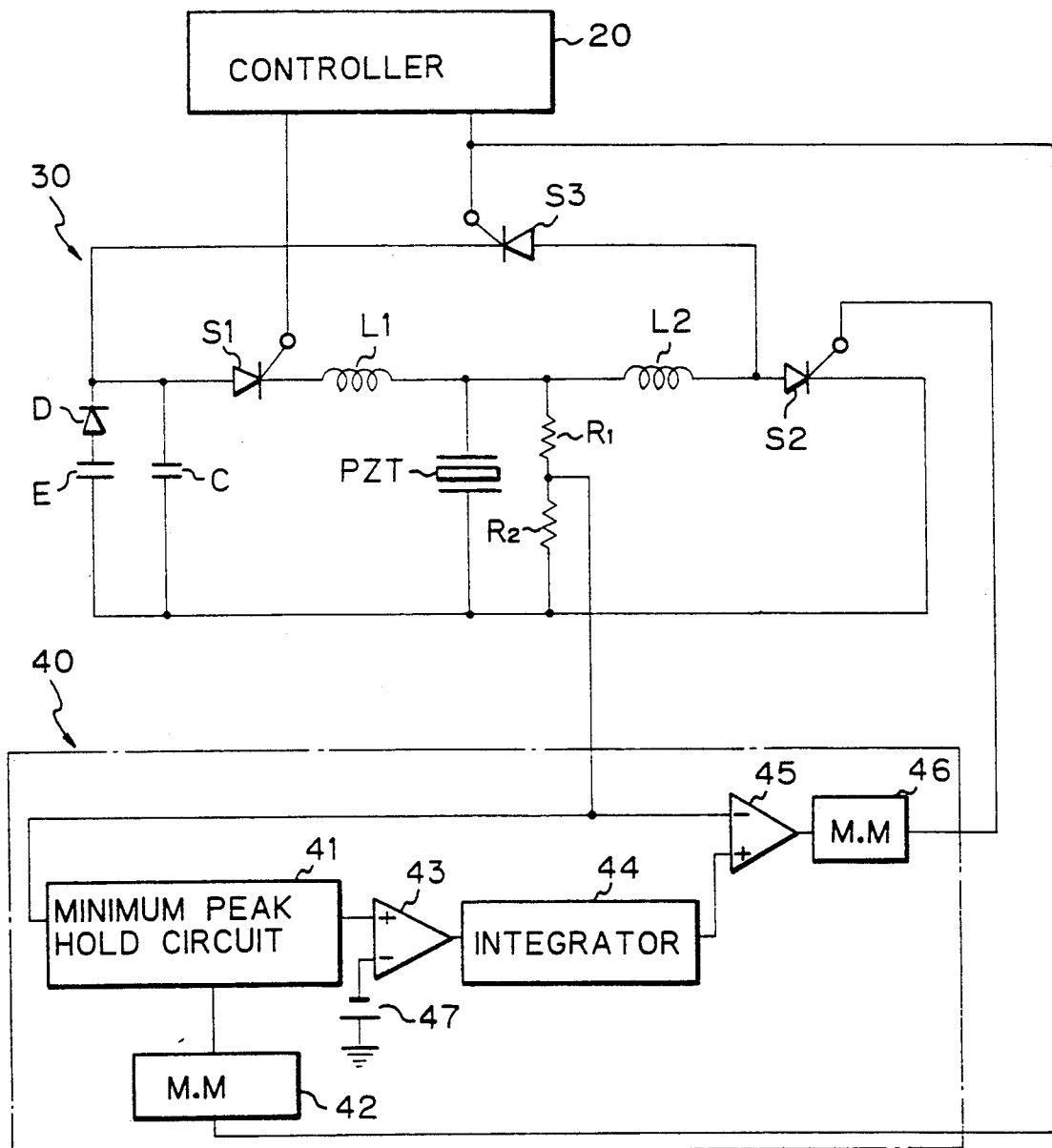
FIG. 1 is a diagram of a circuit for driving a piezoelectric element, as an embodiment of the present invention.

FIG. 1 shows a device 30 for driving a piezoelectric element PZT controlled by a controller 20, wherein a high potential side of a high voltage generator E is connected to a high potential side of a power condenser C through a diode D, and thus the power condenser C is charged by the high voltage generator E through the diode D. The high potential side of the power condenser C is connected to a terminal of the piezoelectric element PZT through a first thyristor S1 constituting a switching means, and a charging coil L1. The node of the charging coil L1 and the terminal of the piezoelectric element PZT are connected to the ground through a discharging coil L2 and a second thyristor S2 constituting a switching means, and the node of the discharging coil L2 and the second thyristor S2 are connected to the node of the diode D and the power condenser C through a third thyristor S3 constituting a switching means. The electrostatic capacity of the power condenser C is much larger than that of the piezoelectric element PZT. In an embodiment shown in FIG. 1, the high voltage generator E generates an output voltage of 320 (V), and thus the voltage at the high potential side of the power condenser C is approximately 320 (V). As understood from FIG. 1, a pair of series resistances $R_1$ and $R_2$ are connected in parallel with the piezoelectric element PZT, and the nodes of these resistances $R_1$ and $R_2$ are connected to the control circuit 40 of the second thyristor S2. The control circuit 40 comprises a minimum peak hold circuit 41, a monostable multivibrator 42, a first comparator 43, an integrator 44, a second comparator 45 and a monostable multivibrator 46. The second thyristor S2 is controlled by a signal output by the monostable multivibrator 46, the nodes of the resistances $R_1$ and $R_2$ are connected to an input terminal of the minimum peak hold circuit 41, an output terminal of the minimum peak hold circuit 41 is connected to a non-reversing input terminal of the first comparator 43, a reversing input terminal of the first comparator 43 is connected to a reference power source 47, an output terminal of the first comparator 43 is connected to a non-reversing input terminal of the second comparator 45 through the integrator 44, a reversing input terminal of the second comparator 45 is connected to the nodes of the resistances $R_1$ and $R_2$, an output terminal of the second comparator 45 is connected to the monostable multivibrator 46, and an output terminal of the monostable multivibrator 42 is connected to the minimum peak hold circuit 41.

The controller 20 outputs an injection start pulse and an injection completion pulse. The first thyristor S1 is actuated by the injection completion pulse, and the third thyristor S3 and the monostable multivibrator 42 are actuated by the injection start pulse.

Figure 2:
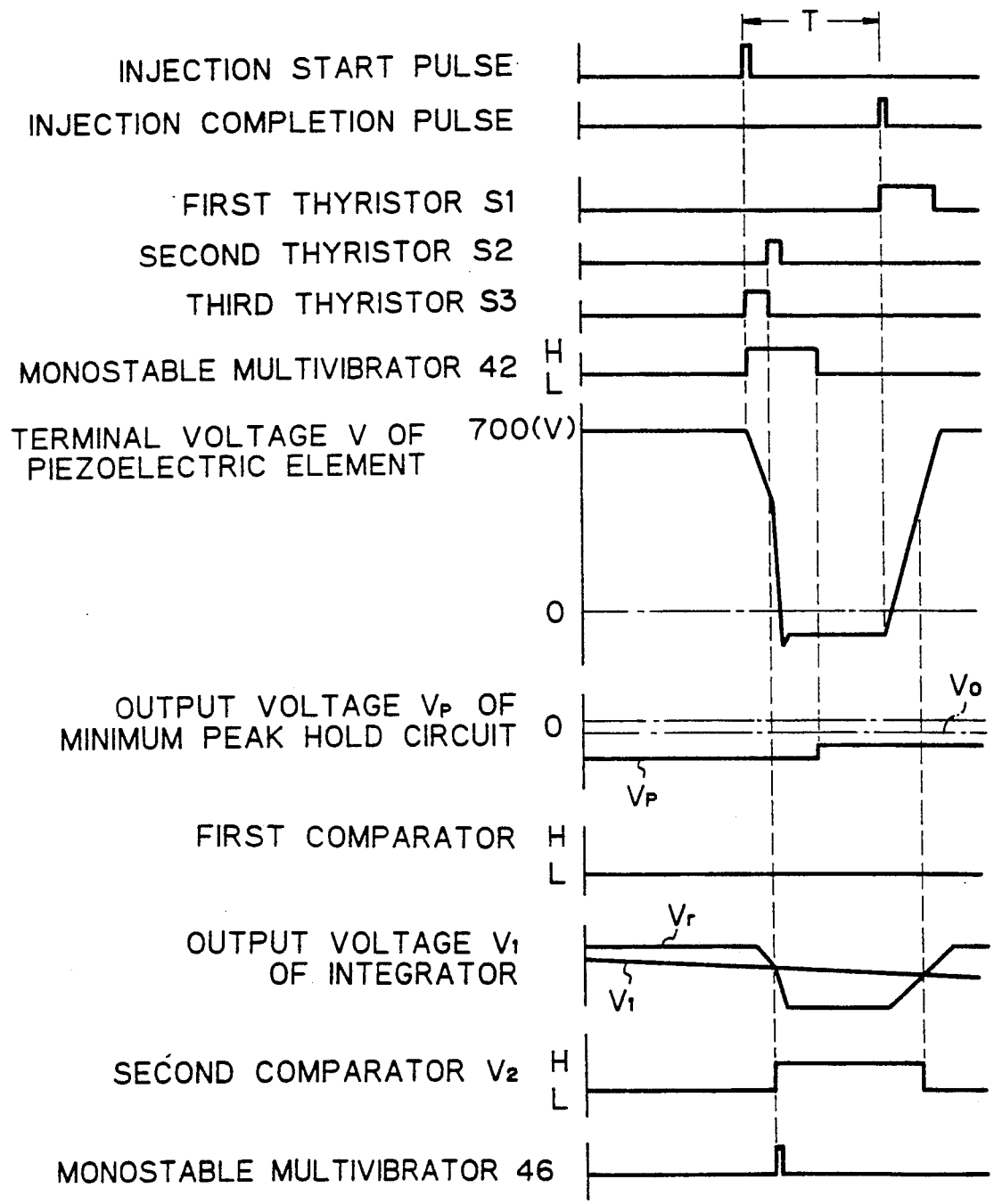
FIG. 2 is a time chart.

Next, with reference to FIG. 2, a case wherein the operation of the piezoelectric element PZT is started from a state in which the piezoelectric element PZT is being charged is described.

As shown in FIG. 2, when the controller 20 outputs the injection start pulse, the third thyristor S3 is turned ON and the output voltage of the monostable multivibrator 42 reaches a high level. When the third thyristor S3 is turned ON, the electric charge charged in the piezoelectric element PZT is discharged to the high potential side of the power condenser C through the discharging coil L2 and the third thyristor S3, so that the discharged electric charge is recovered by the power condenser C, and further, the terminal voltage V of the piezoelectric element PZT is lowered, and at the same time, voltage Vr at the nodes of the resistances $R_1$ and $R_2$ is also lowered. Then, when the voltage Vr at the nodes of the resistances $R_1$ and $R_2$ becomes lower than the output voltage $V_1$ of the integrator 44, the output voltage $V_2$ of the second comparator 45 reaches a high level H, and when the output voltage $V_2$ of the second comparator 45 reaches the high level H, the output voltage of the monostable multivibrator 46 becomes high level, which is a trigger, and the second thyristor S2 is turned ON. When the second thyristor S2 is turned ON, a reverse voltage is applied to the third thyristor S3, and therefore, the third thyristor S3 is turned OFF. At this time, the electric charge in the piezoelectric element PZT is discharged to the ground through the discharging coil L2 and the second thyristor S2, and as a result, the terminal voltage V of the piezoelectric element PZT is further lowered. At that time, since the piezoelectric element PZT and the discharging coil L2 constitute a resonance circuit, the terminal voltage V of the piezoelectric element PZT is lowered to a negative voltage, and the magnitude of this negative voltage is substantially ⅓ that of the terminal voltage V of the piezoelectric element PZT when the discharging operation to the ground is started. Accordingly, the higher the terminal voltage V of the piezoelectric element PZT when the discharging operation to the ground is started, the larger the negative voltage, and thus when a switching timing from OFF to ON of the thyristor S2 is shortened, the negative voltage becomes larger, and when the switching timing from OFF to ON of the second thyristor S2 is lengthened, the negative voltage becomes smaller.

When the discharging operation of the piezoelectric element PZT is completed, thereafter the output voltage of the monostable multivibrator 42 reaches a low level L. Namely, the monostable multivibrator 42 is preset so that the output voltage of the monostable multivibrator 42 becomes a low level L after the discharging operation of the piezoelectric element PZT is completed. When the output voltage of the monostable multivibrator 42 reaches the low level, which is a trigger, the minimum peak hold circuit 41 is reset. The substantially minimum and negative terminal voltage of the piezoelectric element PZT thereafter, i.e., the substantially minimum value of the voltage Vr at the nodes of the resistance $R_1$ and $R_2$, is held by the minimum peak hold circuit 41. Then the minimum peak hold circuit 41 outputs the held minimum and negative terminal voltage Vp of the piezoelectric element PZT. When the output voltage Vp of the minimum peak hold circuit 41 is higher than the reference voltage Vo of the reference power source 47, the output voltage of the first comparator 43 reaches a high level, and when the output voltage Vp of the minimum peak hold circuit 41 is lower than the reference voltage Vo, the output voltage of the first comparator 43 reaches a low level. The output voltage of the first comparator 43 is integrated by the integrator 44, and the result is applied to the non-reversing input terminal of the second comparator 45. When the minimum terminal voltage V of the piezoelectric element PZT, i.e., the voltage Vr at the nodes of the resistances $R_1$ and $R_2$, is lower than the reference voltage Vo, the output voltage of the first comparator 43 reaches the low level and the output voltage of the integrator 44 is gradually lowered. When the output voltage of the integrator 44 is lowered, the switching timing at which the second thyristor S2 is switched from OFF to ON is delayed during a next discharging operation, and therefore, the minimum terminal voltage V of the piezoelectric element PZT is increased. Compared with the above, when the minimum terminal voltage V of the piezoelectric element PZT, i.e., the voltage Vr at the nodes of the resistances $R_1$ and $R_2$, is higher than the reference voltage Vo, the output voltage of the first comparator 43 reaches a high level, and the output voltage of the integrator 44 is gradually increased. When the output voltage of the integrator 44 is increased, the switching timing at which the second thyristor S2 is switched from OFF to ON is shortened during a next discharging operation, and therefore, the minimum terminal voltage V of the piezoelectric element PZT is lowered. Accordingly, the minimum and negative terminal voltage V of the piezoelectric element PZT is equalized to a set voltage determined by the reference voltage Vo.

When an injection time T has passed after the injection start pulse is output, the injection completion pulse is output, and when the injection completion pulse is output, the first thyristor S1 is turned ON. At this time, the electric charge in the power condenser C is charged to the piezoelectric element PZT through the first thyristor S1 and the charging coil L1.

Figure 4:
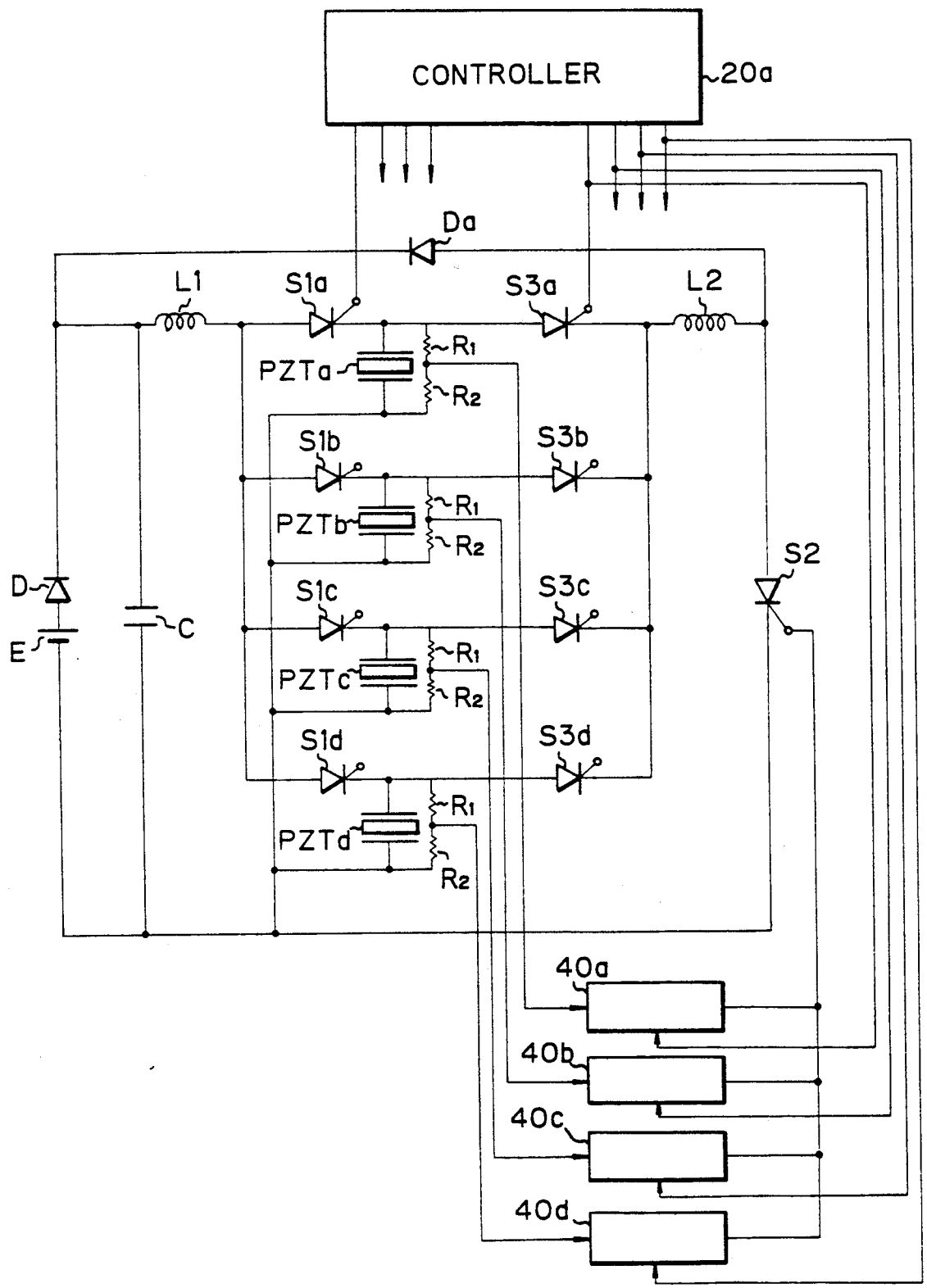
FIG. 4 is a diagram of a circuit for driving the piezoelectric element, as another embodiment of the present invention.

FIG. 4 shows an example in which the device for driving the piezoelectric element shown in FIG. 1 is applied to a device for sequentially controlling a plurality of piezoelectric elements, for example, four piezoelectric elements PZTa, PZTb, PZTc and PZTd.

Referring to FIG. 4, the respective piezoelectric elements PZTa, PZTb, PZTc and PZTd, are provided with first thyristors S1a, S1b, S1c, and S1d, respectively, corresponding to the first thyristor S1 shown in FIG. 1, third thyristors S3a, S3b, S3c and S3d corresponding to the third thyristor S3 shown in FIG. 1, resistances $R_1$ and $R_2$ corresponding to the resistances $R_1$ and $R_2$ in FIG. 1, and driving circuits 40a, 40b, 40c and 40d corresponding to the driving circuit 40 of the second thyristor S2 in FIG. 1. A high voltage generator E, a diode D, a power condenser C, a charging coil L1, a discharging coil L2, and a second thyristor S2 corresponding to the second thyristor S2 shown in FIG. 1 are common to all of the piezoelectric element PZTa, PZTb, PZTc and PZTd. The second thyristor S2 may be controlled by an output signal of any one of the driving circuits 40a, 40b, 40c and 40d. In FIG. 4, a diode Da is inserted between the node of the discharging coil L2 and the second thyristor S2 and the node of the charging coil L1 and the power condenser C, which is different from FIG. 1.

In this embodiment, injection start pulses and injection completion pulses are respectively output by a controller 20a to the respective piezoelectric elements PZTa, PZTb, PZTc and PZTd, and the respective first thyristors S1a, S1b, S1c and S1d are turned ON by the injection completion pulses, and the respective third thyristors S3a, S3b, S3c and S3d are turned ON by the injection start pulses. The monostable multivibrator 42 (see FIG. 1) of the respective driving circuits 40a, 40b, 40c and 40d is actuated by the corresponding injection start pulse. The second thyristor S2 is feedback-controlled by the output signals of the driving circuits 40a, 40b, 40c and 40d so that the minimum and negative terminal voltages of the respective piezoelectric elements PZTa, PZTb, PZTc and PZTd become a set voltage.

The charging operation of the piezoelectric elements PZTa, PZTb, PZTc and PZTd is carried out by turning the corresponding first thyristors S1a, S1b, S1c and S1d ON. When the piezoelectric elements PZTa, PZTb, PZTc and PZTd are discharged, the corresponding third thyristors S3a, S3b, S3c and S3d are initially turned ON, and at this time, an electric charge in the corresponding piezoelectric elements is discharged to a high potential side of the power condenser C through the corresponding third thyristors S3a, S3b, S3c and S3d, the common discharging coil L2 and the diode De. Then, when the second thyristor S2 is turned ON, the electric charge in the piezoelectric elements is discharged to the ground through the corresponding third thyristors S3a, S3b, S3c and S3d, the common discharging coil L2, and the common second thyristor S2. Accordingly, the number of parts can be reduced, and further, inequalities in the charging and discharging operations of the piezoelectric elements can be eliminated by sharing the charging condenser C, the charging coil L1, and the discharging coil L2, or the like.

According to the present invention, the amount of expansion of the piezoelectric element can be equal to a prescribed set amount.

While the invention has been described with reference to specific embodiments chosen for illustration, it should be apparent that numerous modifications could be made thereto by those skilled in the art without departing from the basic concept and scope of the invention.

I claim:

1. A device for driving a piezoelectric element, comprising:
   a power condenser having a high voltage side terminal;
   first switching mans connected between the piezoelectric element and the high voltage side terminal of said power condenser for charging the piezoelectric element by using a high potential at the high voltage side terminal of said power condenser;

second switching means connected between the piezoelectric element and the ground for discharging the piezoelectric element to the ground via a first discharging coil;

third switching means connected between the piezoelectric element and the high voltage side terminal of said power condenser for discharging the piezoelectric element to the high voltage side terminal of said power condenser via a second discharging coil;

control means coupled to the second and third switching means for controlling said second switching means and said third switching means to initially discharge the piezoelectric element to the high voltage side terminal of said power condenser and then discharge the piezoelectric element to the ground; and detecting means coupled to the control means and coupled to the piezoelectric element for detecting a negative voltage at a terminal of the piezoelectric element after the discharging operation of the piezoelectric element is completed and before the charging operation of the piezoelectric element is started, said control means controlling a switching time of said second switching means to make said negative voltage equal to a predetermined voltage.

2. A device according to claim 1, wherein the high voltage side terminal of said power condenser is connected to a constant voltage source to charge said power condenser.

3. A device according to claim 2, wherein a diode forming a forward direction of current from said constant voltage source to said power condenser is connected between said constant voltage source and the high voltage side terminal of said power condenser.

4. A device according to claim 1, wherein a charging coil is serially connected to said first switching means.

5. A device according to claim 1, wherein said first switching means comprises a thyristor.

6. A device according to claim 1, wherein said first discharging coil and said second discharging coil are formed of the same discharging coil.

7. A device according to claim 1, wherein said second switching means and said third switching means respectively comprise thyristors, when the thyristor which is the second switching means is turned ON, the thyristor which is the third switching means is automatically turned OFF.

8. A device according to claim 1, wherein said detecting means comprises a minimum peak hold circuit for holding said negative voltage.

9. A device according to claim 1, wherein a pair of resistances are connected between the terminals of the piezoelectric element and said detecting means comprises a minimum peak hold circuit for holding a substantially minimum voltage generated at a node of said pair of resistances.

10. A device according to claim 1, wherein said detecting means is provided with a monostable multivibrator actuated when said third switching means is turned ON and said detecting means detects the negative voltage of the piezoelectric element after a lapse of time determined by said monostable multivibrator when said monostable multivibrator is actuated.

11. A device according to claim 1, wherein said control means delays a time when said second switching means is turned ON, if said negative voltage becomes lower than said predetermined voltage and shortens a time when said second switching means is turned ON, if said negative voltage becomes higher than said predetermined voltage.

12. A device according to claim 11, wherein said control means is provided with a first comparator, an integrator connected to an output terminal of said first comparator and a second comparator, a non-reversing input terminal of said first comparator is connected to an output terminal of said detecting means, a reversing input terminal of said first comparator is connected to a reference power source, a non-reversing input terminal of said second comparator is connected to an output terminal of said integrator, the voltage of the piezoelectric element is input to a reversing input terminal of said second comparator and said second switching means is controlled by the output of said second comparator.

13. A device according to claim 12, wherein a monostable multivibrator is connected between said second comparator and said second switching means.

14. A device according to claim 1, wherein said device is provided with a plurality of piezoelectric elements, said first switching means, said third switching means, said detecting means and said control means are respectively provided for the respective piezoelectric elements, and said power condenser and said switching means are common to all piezoelectric elements.

15. A device according to claim 14, wherein the high voltage side terminal of said power condenser is connected to the respective piezoelectric elements through a common charging coil and the corresponding respective first switching means.

16. A device according to claim 14, wherein the respective piezoelectric elements are discharged to the ground through said respective corresponding third switching means, a common discharging coil and the common second switching means and a node of said common discharging coil and said common second switching means is connected to the high voltage side terminal of said power condenser.

17. A device according to claim 16, wherein a diode for forming a forward direction of current from said node to said high voltage side terminal is connected between said node and said high voltage side terminal.

* * * * *

UNITED STATES PATENT AND TRADEMARK OFFICE
CERTIFICATE OF CORRECTION

PATENT NO. : 5,204,576
DATED : April 20, 1993
INVENTOR(S) : Masaki MITSUYASU

It is certified that error appears in the above-identified patent and that said Letters Patent is hereby corrected as shown below:

Column 3, line 20, after "ered," change the comma to a period and delete "the" and change "therefore," to --Therefore,--.

Column 6, line 66, change "mans" to --means--.

Signed and Sealed this

Second Day of August, 1994

Attest:

BRUCE LEHMAN

Attesting Officer

Commissioner of Patents and Trademarks